UNITED STATES PATENT OFFICE.

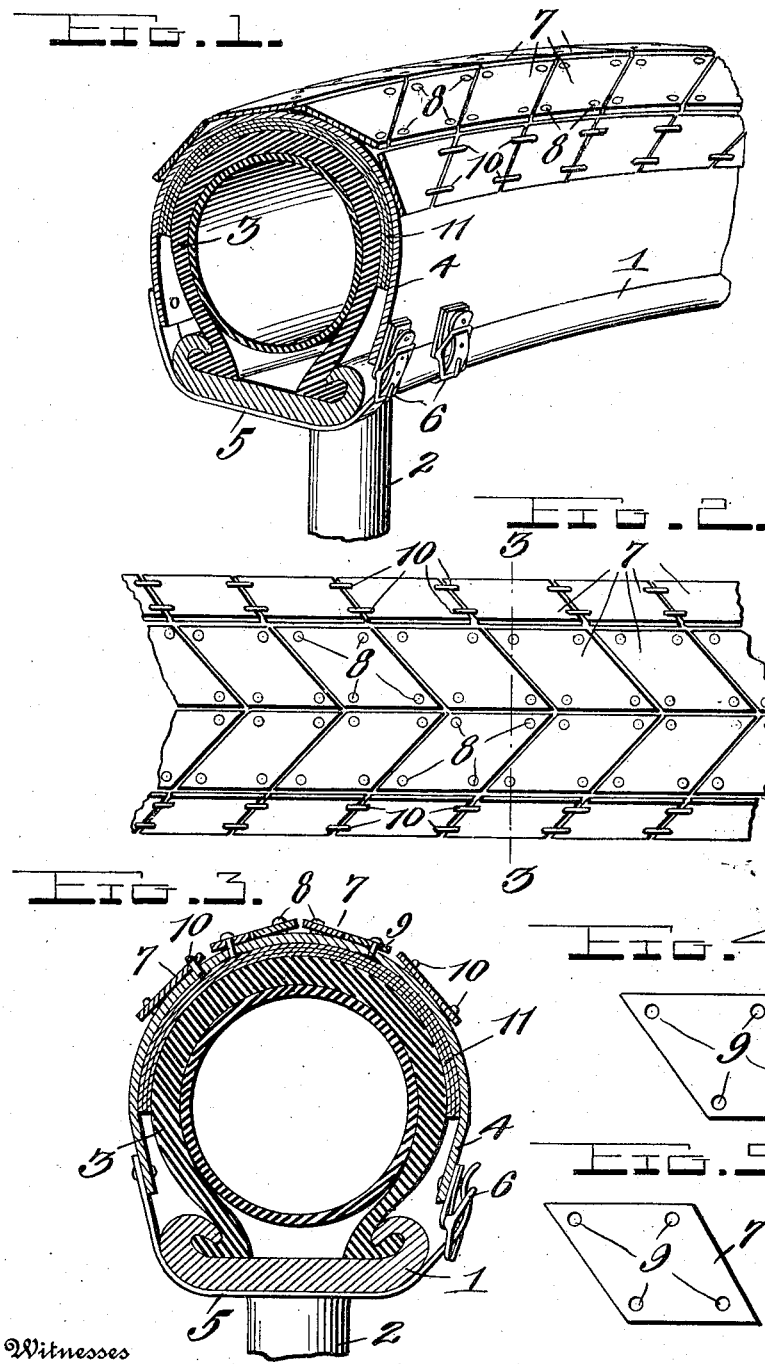

BONA SIMS, OF VALLEY SPRING, TEXAS.

ARMORED TREAD FOR PNEUMATIC TIRES.

1,033,741.         Specification of Letters Patent.      Patented July 23, 1912.

Application filed February 8, 1911. Serial No. 607,325.

*To all whom it may concern:*

Be it known that I, BONA SIMS, a citizen of the United States, residing at Valley Spring, in the county of Llano and State of Texas, have invented certain new and useful Improvements in Armored Treads for Pneumatic Tires, of which the following is a specification, reference being had to the accompanying drawings.

My invention relates to new and useful improvements in treads for tires, and more particularly to that class known as externally armored treads, and the primary object of my invention is to provide an armor of simple design which may be removably applied to a tire to make the same puncture-proof.

It is a further object of my invention to provide a continuous leather tread having a metal covering thereon.

A further object of my invention is to provide a plurality of metal plates adapted to form the metal covering for the leather tread.

A still further object is to provide a device which may be quickly and easily applied to any pneumatic tire.

It is a well known fact that one of the greatest expenses incurred in the up-keep of automobiles is the tire expense. The tires are being continually punctured by glass, nails, and other devices found on the many bad roads of the country, and it is to prevent these numerous punctures and correspondingly great expense in the up-keep of the machine, that I provide my improved device.

With these and other objects in view, my invention consists in the novel features of construction, combination and arrangement of parts as will be hereinafter described and more particularly pointed out in the specification and claims.

In the accompanying drawings forming a part of this application, Figure 1 is a fragmentally perspective view of a wheel having my improved armored tread applied thereto; Fig. 2 is a top plan view thereof; Fig. 3 is a transverse section as seen on line 3—3, Fig. 2; Fig. 4 is a detail view of one form of metal plate used, and Fig. 5 is a similar view of the other form of plate used.

In carrying out my invention I shall refer to the drawings in which similar reference characters designate corresponding parts throughout the several views, and in which—

1 indicates a wheel of the usual or any preferred type used on automobiles, and 2 and 3 indicate, respectively, the spokes and outer casing of the tire mounted on said wheel, said tire being adapted to receive my improved armored tread.

My improved tread consists of a continuous leather strip or shoe 4 of a width sufficient to cover the whole of the tire, and riveted adjacent to one of the side edges thereof are a plurality of straps 5, which are adapted to be passed around the felly of the wheel and engaged with a plurality of buckles 6 mounted adjacent the opposite side edge of said shoe, whereby the shoe may be securely held to the tire. This shoe or strip, it will be seen completely covers the outer casing 3, and the straps and buckles are so positioned to engage one another at opposite sides of each spoke, whereby the shoe 4 will be prevented from slipping upon the rotation of the wheel. This leather shoe is provided upon the outer surface thereof with a metal covering comprising a plurality of metal plates 7 substantially diamond shape, said plates being so alined thereon as to form four metal strips, the two inner ones forming the main portion of the tread, while the outer strips form a protection for the sides of the tire. The two central strips are formed by applying plates in pairs to the leather shoe so that one side of each is substantially contacting with the adjacent side edge of the other, which disposes the individual plates at such an angle as to form an inverted V-shaped opening between the two at the lower portion thereof. Each pair of plates is brought together in a similar manner as described and inserted within the inverted V-shaped space so that the upper side edges of the second pair are substantially in contact with the side edges forming the inverted V-shaped space of the succeeding pair. In this manner it will be seen that a substantially metal tread will be formed throughout the periphery of the shoe. These diamond designed metal plates are applied to the leather shoe by stretching said shoe its full length and inserting tubular rivets 8 through the openings 9 of said plates and the leather shoe 4, the outer edges of said rivets being spread upon the inner face of said shoe whereby said plates are securely held thereto.

The riveting of the plates to the shoe, as above described, refers particularly to the central alinement of plates, but as stated, the outside strips of plates are preferably secured to one another and to the shoe by inserting the elongated metal staples 10 through the openings thereof. These plates, forming the outside strips, are applied also to the shoe when the same is in its outstretched position, allowing one side edge of each to substantially contact with the outside edges of the plates forming the central portion of the metal tread, but these plates which form these outside strips are not truly diamond shaped as are those forming the central portion thereof. This is due to the fact that the curvature of the shoe must be taken into consideration, and in view thereof I provide the outside edges of these latter plates of shorter length than the inside edges which contact with the central portion of the tread. When these are properly positioned and the leather shoe placed upon the tire, the outer edges of these latter plates form a substantial circle therearound. As before stated, these plates are applied to the leather shoe when the same is outstretched, and as the openings 9 thereof are positioned adjacent each point of the substantially diamond designed plates, and as the central portion of the tread formed by the two strips of plates are secured by means of rivets inserted in each respective opening, it will be seen that when the leather shoe is positioned upon the tire, the edges of the plates which were contacting when applied will be separated from each other. This opening or space which occurs when the shoe has been applied to the tire will be closed, or rather the edges of the plates brought into contact with one another as that portion of the tread comes into contact with the ground, since the weight of the machine thereover will cause said plates to be flattened out, thereby preventing nails, tacks, glass and other substances, which naturally cause punctures to pneumatic tires, from injuring the tire within.

As most punctures occur within the space covered by the two central strips of plates, it is not so essential that the outer strips of plates be applied in the same manner as said central ones, so that I prefer to apply the same in the manner above described, that is, by connecting the plates with each other and with the leather shoe by inserting said staples 10 through the openings therein. This doubtless forms a space between the outer strips and the central portion of the tread, but as the provision of these outer strips is not so essential as the central ones, and as the space left between the same is not immediately over the weight of the machine, it is hardly probable that any injurious materials will enter.

The staples 10 and rivets 8, which hold the respective plates upon the outer surface of the shoe 4, extend completely through said shoe and are bent in engagement with the inner face thereof, and to protect the casing of the tire from the bent portions of said staples and rivets I provide layers 11 of felt or rubber, as preferred, which are glued to said inner face, and it will be seen that this protection also allows an air space between the tire and armored shoe. The metal plates which form the armored tread for the casing are, of course, applied to the said casing in manufacturing the same and as the casings are made in sizes according to the size of tire for which the same is desired, it is also most desirable that said plates be made in sizes accordingly. The casings being bought and sold in sizes according to the size of tires used, may be easily applied after said tires have been inflated, by merely slipping the same thereon and by engaging the straps on one side of the casings with the buckles on the opposite sides and extending said straps on each side of each spoke, said casings will be prevented from slipping during the rotation of the wheels.

From the foregoing it will be seen that I have provided a metal tread comprising strips formed from a plurality of plates secured to a leather casing which is adapted to be placed over a tire. It will also be seen that I have provided such means for the application of said plates to the leather casing as will prevent all injurious matter from entering therethrough. It will further be seen that by applying each plate of the main portion of the tread individually to the leather shoe, spaces will be formed between said plates upon the application of the shoe to the tire, but that portion of the tread in engagement with the ground will have that space, formed between the plates, closed through the weight of the machine thereover, and thereby making it impossible for nails, glass and the like to enter therebetween. It will still further be seen that my device may be quickly and easily applied to the tire and is of such simple construction that the same may be manufactured at an extremely low price.

What I claim is:

1. An externally armored tread for tires, comprising a flexible casing, a plurality of metallic plates of diamond design, each riveted adjacent the corners thereof to said casing and arranged in rows throughout the periphery of the same, the plates of one row being arranged divergently with respect to the plates of the adjacent row, additional plates of irregular but substantially diamond shape, and means to secure said latter plates together and to the casing, said last referred to plates being arranged in rows beyond the rows of the aforesaid plates and having their outer edges disposed in circular alinement.

2. An externally armored tread for tires, comprising a flexible casing, a plurality of metallic plates of substantially diamond design, each riveted adjacent the corners thereof to said casing, said plates being arranged in rows throughout the periphery of the casing and the plates of one row being arranged divergently with respect to the plates of the adjacent row, additional plates of irregular but substantially diamond shape linked one to the other in a row outside of each of the other rows, the linking means between said latter plates also securing the same to the casing and the opposed edges of the various rows of plates being adapted to contact with that portion of the tread which comes in contact with the ground.

In testimony whereof I hereunto affix my signature in the presence of two witnesses.

BONA SIMS.

Witnesses:
E. P. MAY,
H. J. GARTMAN.

Copies of this patent may be obtained for five cents each, by addressing the "Commissioner of Patents, Washington, D. C."